(12) United States Patent
Furihata

(10) Patent No.: US 10,126,921 B2
(45) Date of Patent: Nov. 13, 2018

(54) FIELD DEVICE MANAGEMENT APPARATUS, DEVICE INFORMATION DISPLAY METHOD, COMPUTER-READABLE STORAGE MEDIUM

(71) Applicant: YOKOGAWA ELECTRIC CORPORATION, Musashino-shi, Tokyo (JP)

(72) Inventor: Ryouhei Furihata, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 397 days.

(21) Appl. No.: 14/560,063

(22) Filed: Dec. 4, 2014

(65) Prior Publication Data

US 2015/0160816 A1 Jun. 11, 2015

(30) Foreign Application Priority Data

Dec. 5, 2013 (JP) .................................. 2013-252044

(51) Int. Cl.
*G06F 3/0482* (2013.01)
*G06F 3/0484* (2013.01)
(Continued)

(52) U.S. Cl.
CPC ....... *G06F 3/0484* (2013.01); *G05B 19/0425* (2013.01); *G06F 3/0482* (2013.01); *H04L 41/22* (2013.01); *G06F 9/451* (2018.02)

(58) Field of Classification Search
CPC .... G06F 3/0482; G06F 3/0484; G06F 9/4443; G06F 9/451; H04L 41/22
See application file for complete search history.

(56) References Cited

U.S. PATENT DOCUMENTS 5,796,602 A * 8/1998 Wellan ............... G05B 19/0423
 700/1
6,094,600 A * 7/2000 Sharpe, Jr. .......... G05B 19/0423
 700/19
(Continued)

FOREIGN PATENT DOCUMENTS

JP 2002-268730 A 9/2002
JP 2004-118475 A 4/2004
(Continued)

OTHER PUBLICATIONS

Isao, et al.; "FieldMate Field Device Management Tool for the New Era", Yogogawa Technical Report, English Edition, Dec. 2007, vol. 44, 4 pages total, XP002565596.
(Continued)

*Primary Examiner* — Eric J. Bycer
(74) *Attorney, Agent, or Firm* — Sughrue Mion, PLLC

(57) ABSTRACT

A field device management apparatus is communicably connected to one or more field devices. The field device management apparatus includes a communication module configured to obtain, from a field device connected to the field device management apparatus, fundamental information serving as inherent information, and one or more parameters determining operation contents, a device information storage module configured to determine device identification information based on the fundamental information, and to store, in association with the device identification information, device information including the fundamental information, the parameters, and one or more comments optionally input concerning the field devices, and a user interface module configured to generate a device information display screen that displays a list of the device information corresponding to each of the field devices which are (Continued)

being connected to the field device management apparatus, and that receives an edit of the device information.

14 Claims, 10 Drawing Sheets

(51) Int. Cl.
  *G06F 9/451* (2018.01)
  *H04L 12/24* (2006.01)
  *G05B 19/042* (2006.01)

(56) References Cited

U.S. PATENT DOCUMENTS

| | | | | |
|---|---|---|---|---|
| 2003/0220969 | A1* | 11/2003 | Kojima | G06F 17/3089 709/203 |
| 2004/0070599 | A1 | 4/2004 | Mori et al. | |
| 2004/0073665 | A1* | 4/2004 | Fujiwara | G06Q 10/10 709/224 |
| 2005/0222933 | A1* | 10/2005 | Wesby | G06Q 40/00 705/36 R |
| 2006/0123159 | A1* | 6/2006 | Clow | G06F 3/0481 710/48 |
| 2006/0279774 | A1* | 12/2006 | Matsuoka | H04L 12/2803 358/1.15 |
| 2007/0123249 | A1* | 5/2007 | Sun | G01S 19/14 455/423 |
| 2009/0222242 | A1 | 9/2009 | Kodama | |
| 2010/0023140 | A1 | 1/2010 | Kodama et al. | |
| 2010/0057947 | A1* | 3/2010 | Nakagawa | G05B 19/4185 710/19 |
| 2010/0058199 | A1* | 3/2010 | Gera | G06F 9/4443 715/752 |
| 2010/0223566 | A1* | 9/2010 | Holmes | G06F 3/0481 715/764 |
| 2010/0313154 | A1* | 12/2010 | Choi | G06F 3/0219 715/765 |
| 2011/0119622 | A1* | 5/2011 | Niki | G06F 3/0481 715/788 |
| 2011/0154228 | A1* | 6/2011 | Kinoshita | G06F 3/0488 715/763 |
| 2011/0238375 | A1 | 9/2011 | Fujisaki | |
| 2012/0290966 | A1* | 11/2012 | Chae | G09G 5/14 715/778 |
| 2013/0080952 | A1* | 3/2013 | Dolph | G06F 17/243 715/767 |
| 2014/0317638 | A1* | 10/2014 | Hayes | G11B 27/005 719/318 |

FOREIGN PATENT DOCUMENTS

| | | |
|---|---|---|
| JP | 2006-252145 A | 9/2006 |
| JP | 2007-124206 A | 5/2007 |
| JP | 2009-211308 A | 9/2009 |
| JP | 2010-26843 A | 2/2010 |
| JP | 2010061352 A | 3/2010 |
| JP | 2011-203775 A | 10/2011 |
| JP | 2011-215917 A | 10/2011 |

OTHER PUBLICATIONS

"FieldMate Versatile Device Management Wizard", May 2013, 382 pages total, XP055210359.
Search Report dated Sep. 7, 2015, issued by the European Patent Office in counterpart European Application No. 14196230.8.
Isao Hirooka, et al.; "FieldMate Device Management tool for the New Era"; Yokogawa Technical Report, published by Yokogawa Electric Corporation, vol. 51 No. 2; May 20, 2007; 8 pages total.

* cited by examiner

| ALL PARAMETERS | | |
|---|---|---|
| SAVE  HTML | | |
| LABEL | VALUE | UNIT |
| MODEL | EJX110 M | |
| STYLE NO. | + 02.00 | bar |
| PRES LRL | -1.00000 | bar |
| PRES URL | +1.00000 | bar |
| P MIN SPAN | +0.00500 | bar |
| SP LRL | +0.00000 | MPa |
| SP URL | +25.0000 | MPa |
| SP MIN SPAN | +0.50000 | MPa |
| SELF CHECK | ERROR | |
| TAG NO. | EJX110 M | |
| PRES UNIT | bar | |
| PRES LRV | + 0.1 | bar |

2013/11/21 12:49:04        CANCEL   CLOSE

*FIG. 9*

FIELD DEVICE MANAGEMENT APPARATUS, DEVICE INFORMATION DISPLAY METHOD, COMPUTER-READABLE STORAGE MEDIUM

CROSS-REFERENCE TO RELATED APPLICATION

The present application claims priority to Japanese Patent Application No. 2013-252044 filed on Dec. 5, 2013, the entire content of which is incorporated herein by reference.

BACKGROUND

Technical Field

The present invention relates to technologies for improving the operability of a field device management apparatus used in maintenance and the like of field devices.

Related Art

In industrial plants, field devices, such as measurement devices, valves, actuator devices, and the like, operate under the control of a control monitoring system. The control monitoring system is interconnected to each field device via a fieldbus such as a Foundation (registered trademark) Fieldbus, or a Highway Addressable Remote Transducer (HART (registered trademark)). Various types of process control can be implemented by performing communication via the fieldbus. In recent years, wireless communication has been generalized.

Maintenance work is performed on field devices periodically, irregularly, at occurrence of abnormality, at installation of an additional device, or the like. Non-patent document 1 describes a field device management tool "FieldMate" (registered trademark) to be used in the maintenance and the like of field devices.

This field device management tool is an application program that is installed in a notebook personal computer, a tablet computer, a handheld computer, and the like, which can be connected to a field device or fieldbus using a connecting tool, and that enables the setting and the adjustment of various parameters of field devices and the management of maintenance of field devices. Executing this application program enables the computer to function as a field device management apparatus. The field device management apparatus performs the management of field devices, utilizing tools, such as device type manager works (DTM Works), prepared corresponding to the field devices, respectively.

PRIOR ART DOCUMENT

Patent Document

[Patent Document 1] JP-A-2010-61352

Non-patent Document

[Non-patent Document 1] I. Hirooka, and three others, "FIELDMATE FIELD DEVICE MANAGEMENT TOOL FOR NEW ERA", Yokogawa Technical Report, published by Yokogawa Electric Corporation, May 20, 2007, Vol. 51 No. 2 (2007), pp. 45-48.

Workers performing the management of field devices, using a field device management apparatus, routinely perform the following works. Incidentally, the workers are, e.g., plant managers, service staff members of vendors of field devices, and the like.

1) Before a work, the worker checks fundamental information and parameters, which concern field devices, and records the fundamental information and the parameter as pre-work information. Incidentally, the fundamental information is a tag name, a vendor name, a device identification (ID), a status, and the like, each of which is inherent information of a field device. The parameters are information determining the contents of works performed on the field devices.

2) According to an object of the work, the worker changes the fundamental information and the parameters.

3) The worker records the changed fundamental information and the changed parameters as post-work information. In addition, the worker makes a work contents report in a predetermined format.

In these works, it is necessary to refer to information concerning the field devices serving as work targets, and various types of information representing works performed in the past. Additionally, in an actual field, memoranda describing notes of caution are widely utilized.

The workers performing the management of field devices frequently perform such works on various field devices in versatile plants. Accordingly, the operability of the field device management apparatus has a profound effect on work efficiency. Thus, it is desired to further improve the operability of the field device management apparatus.

SUMMARY

Exemplary embodiments of the invention provide a field device management apparatus whose operability is improved.

A field device management apparatus communicably connected to one or more field devices, according to an exemplary embodiment of the invention, comprises:

a communication module configured to obtain, from a field device connected to the field device management apparatus, fundamental information serving as inherent information, and one or more parameters determining operation contents;

a device information storage module configured to determine device identification information based on the fundamental information, and to store, in association with the device identification information, device information including the fundamental information, the parameters, and one or more comments optionally input concerning the field devices; and a user interface module configured to generate a device information display screen that displays a list of the device information corresponding to each of the field devices which are being connected to the field device management apparatus, and that receives an edit of the device information.

The device information may further include a history of operations performed on the field devices, and the user interface module may display, on the device information display screen, a history of operations concerning the field devices which are being connected to the field device management apparatus.

The user interface module may change a display mode of the history of operations according to an operation time-period.

The user interface module may generate a stored-device information display screen displaying the device information that is stored in the device information storage module and that concerns the field device which has been connected in a past time and is not being connected to the apparatus.

The user interface module may instantly update, when the device information is edited on the device information display screen, device information stored in the device information storage module.

The field device management apparatus may further comprise:

a work report making module configured to make a work report in a predetermined format, based on the one or more parameters stored in the device information storage module.

If the obtained fundamental information includes a device identifier by which the field device is uniquely identified, the device information storage module may use the device identifier as the device identification information, and if the obtained fundamental information does not include the device identifier, the device information storage module may use, as the device identification information, information obtained by combining a plurality of information pieces other than the device identifier, which are included in the fundamental information.

A device information display method of a field device management apparatus communicably connected to one or more field devices, according to an exemplary embodiment of the invention, comprises:

obtaining, from a field device connected to the field device management apparatus, fundamental information serving as inherent information, and one or more parameters determining operation contents;

determining device identification information based on the fundamental information, and storing, in association with the device identification information, device information including the fundamental information, the parameters, and one or more comments optionally input concerning the field devices; and generating a device information display screen that displays a list of the device information corresponding to each of the field devices which are being connected to the field device management apparatus, and that receives an edit of the device information.

A computer-readable storage medium stores a program causing a computer to operate as a field device management apparatus communicably connected to one or more field devices, according to an exemplary embodiment of the invention, the program causing the computer to function as:

a communication module configured to obtain, from a field device connected to the field device management apparatus, fundamental information serving as inherent information, and one or more parameters determining operation contents;

a device information storage module configured to determine device identification information based on the fundamental information, and to store, in association with the device identification information, device information including the fundamental information, the parameters, and one or more comments optionally input concerning the field devices; and a user interface module configured to generate a device information display screen that displays a list of the device information corresponding to each of the field devices which are being connected to the field device management apparatus, and that receives an edit of the device information.

According to the exemplary embodiments of the invention, it is possible to improve the operability of a field device management apparatus.

BRIEF DESCRIPTION OF THE DRAWINGS

FIG. 5 is a view illustrating an example of a parameter display screen.

FIG. 9 is a view illustrating a process of making a work report.

DETAILED DESCRIPTION

Figure 1:
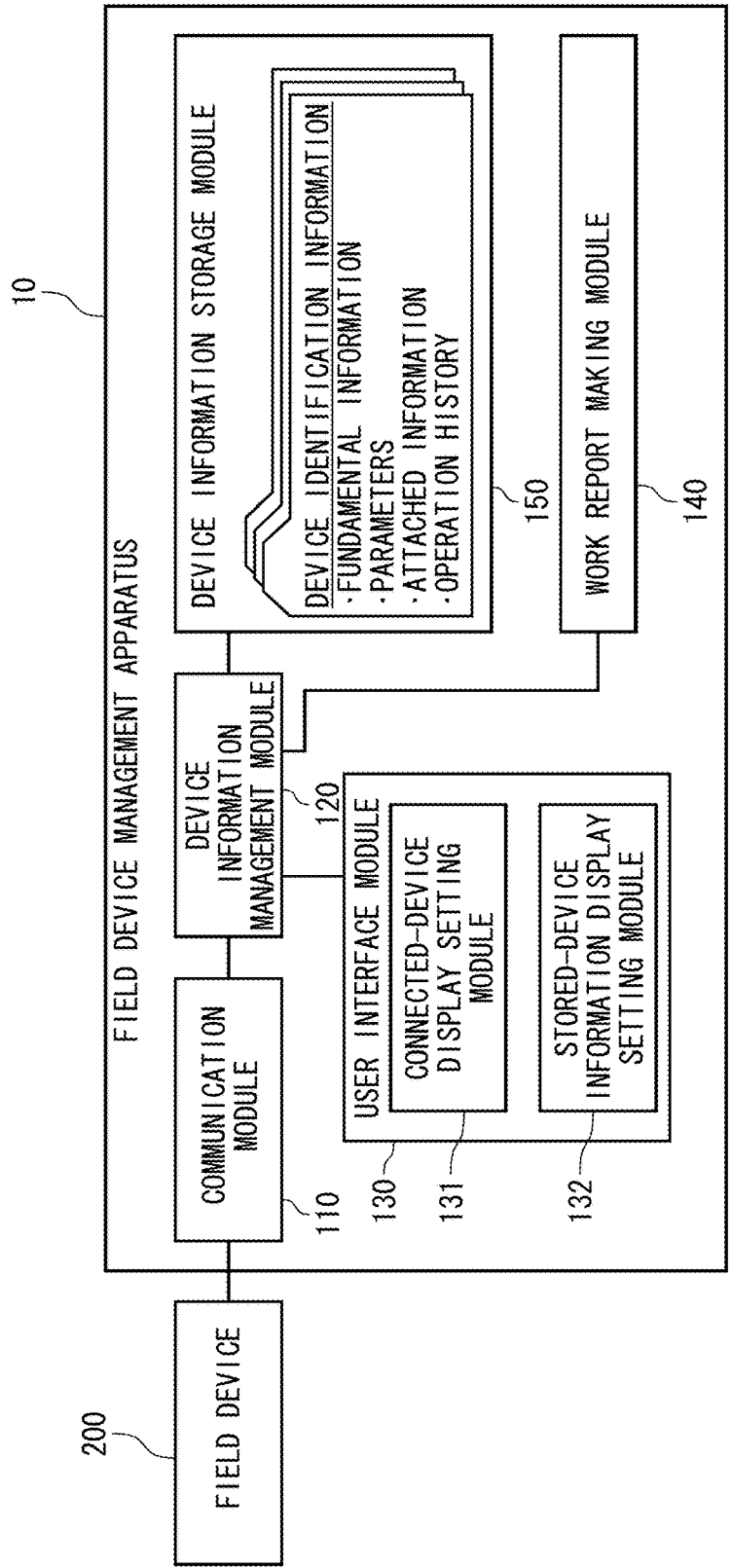
FIG. 1 is a block diagram illustrating a configuration of a field device management apparatus according to an embodiment.

Hereinafter, an embodiment of the invention is described with reference to the accompanying-drawings. FIG. 1 is a block diagram illustrating a configuration of a field device management apparatus 10 according to this embodiment. The field device management apparatus 10 can be embodied by installing a field device management tool in a general-purpose computer such as a notebook personal computer or a tablet computer. Alternatively, the field device management apparatus 10 can be embodied as a handheld dedicated terminal, or the like.

As illustrated in FIG. 1, the field device management apparatus 10 includes a communication module 110, a device information management module 120, a user interface module 130, a work report making module 140, and a device information storage module 150.

The communication module 110 communicates with a field device 200, and reads and writes fundamental information and parameters from and to the field device 200. The communication of the communication module 110 with the field device 200 can use various protocols, such as Foundation (registered trademark) Fieldbus, HART (registered trademark), a broadcast rapid access intelligent network (BRAIN), and wireless communication protocols, such as a protocol based on a wireless communication standard of International Society of Automation (ISA) 100.11 a, and a WirelessHART (registered trademark).

Here, note that the fundamental information concerning the field device 200 is inherent information of the field device 200. Specifically, a tag name, a vendor name, a device ID, a status, a device type, and the like, of the field device. The fundamental information differs depending on the used communication protocol. The parameters handled by the field device management apparatus 10 may be set to be a parameter group defined by a general device description (DD) file, or a parameter group defined by a DD file corresponding to the field device 200.

Figure 2A:
FIG. 2A is a block diagram illustrating mode of the connection between the field device management apparatus and a field device.
Figure 2B:
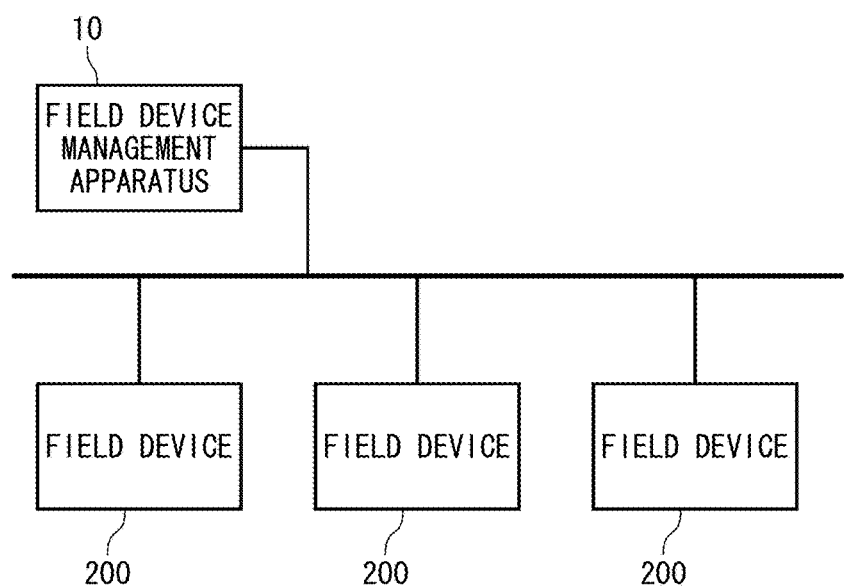
FIG. 2B is a block diagram illustrating mode of the connection between the field device management apparatus and field devices.

Incidentally, the mode of the connection between the field device management apparatus 10 and the field device 200 is often that, as illustrated in FIG. 2A, the single field device management apparatus 10 is connected directly to the single field device 200. However, as illustrated in FIG. 2B, the single field device management apparatus 10 may be connected to plural field devices 200. In any of these cases, the communication may be either wire communication or wireless communication.

Turning back to the description made with reference to FIG. 1, the device information management module 120 controls the communication module 110, the user interface module 130, and the work report making module 140 and manages device information concerning the field devices 200. The device information managed by the device information management module 120 includes fundamental information, parameters, attached information, and operation histories. The attached information may include arbitrary comments and image information recorded by workers.

The device information storage module 150 is a database that stores device information which are collected from the field devices 200 and edited via the user interface module 130. This embodiment is adapted to automatically store the device information in real time without workers' explicit storage instructions. The device information storage module 150 manages the device information by associating information elements included in the device information with one another using device identification information for identifying the field devices 200.

If the device ID represents the field device 200 that uses many communication protocols included in the fundamental information, the device ID uniquely identifying this field device 200 is used as the device identification information. On the other hand, if the device ID represents the field device 200 that uses a communication protocol, such as a BRAIN protocol, which is not included in the fundamental information, another type of information obtained by connecting the device type and the device tag is used as the device identification information. The device tag is field device identification information that can optionally be set by a worker.

The user interface module 130 displays device information and the like under the control of the device information management module 120, and generates a screen for receiving setting-operations such as a change-operation and an edit-operation, from workers. The display of the device information is configured such that useful information for the workers can be inspected. Thus, the operability of the field device management apparatus 10 is improved. The setting-operations can be received by utilizing a touch panel, a pointing device, a keyboard, and the like.

According to this embodiment, the user interface module 130 includes a connected-device display setting module 131 and connected-device display setting module 131. The connected-device display setting module 131 displays device information concerning the field devices 200 which are being connected to the field device management apparatus 10, and that receives edit-operations. The stored-device information display setting module 132 displays the device information stored in the device information storage module 150, and that receives edit-operations.

The work report making module 140 outputs the device information, the parameters and the like, which are stored in the device information storage module 150, in a predetermined format. The predetermined format may be adapted to the template of a work report. If the work report making module 140 outputs it before a work of changing the parameters, the work report can be used as a pre-work information report. If the work report making module 140 outputs it after a work of changing the parameters, the work report can be used as a post-work information report. Further, by extracting the changed parameter and outputting, the work report can be used as a work contents report.

Next, an operation of the field device management apparatus 10 of the above configuration is described. First, an operation that the device information management module 120 performs by controlling the connected-device display setting module 131 of the user interface module 130 is described with reference to a flowchart illustrated in FIG. 3.

First, in step S101, the device information management module 120 obtains fundamental information and parameters from the field device 200 which is communicable with the device information management module 120 via the communication module 110. The fundamental information and the parameters obtained therefrom depend upon the communication protocol, the field device 200, and the utilized DD file.

Then, in step S102, the device identification information is specified, based on the fundamental information obtained from the field device 200. As described above, if the fundamental information includes the device ID, the device ID is used as the device identification information. If the fundamental information does not include the device ID, information or the like obtained by combining the device type with the device tag is used as the device identification information.

When the device identification information is specified, in step S103, it is determined whether the device information associated with the specified device identification information is already stored in the device information storage module 150.

If the device information associated with the specified identification information has not been stored the device information storage module 150 yet (No in step S103), in step S104, the obtained fundamental information and the obtained parameters are newly stored in the device information storage module 150 by being associated with the specified device identification information.

On the other hand, if the device information associated with the specified device identification information has been already stored the device information storage module 150 (Yes in step S103), in step S105, the stored-device information is updated by merging the obtained fundamental information and the obtained parameters to the stored device information.

That is, regardless of whether the associated device information is already stored therein or not, the latest device information and the latest parameters obtained from the field device 200 are instantly stored in the device information storage module 150 without a worker's instruction.

Figure 4:
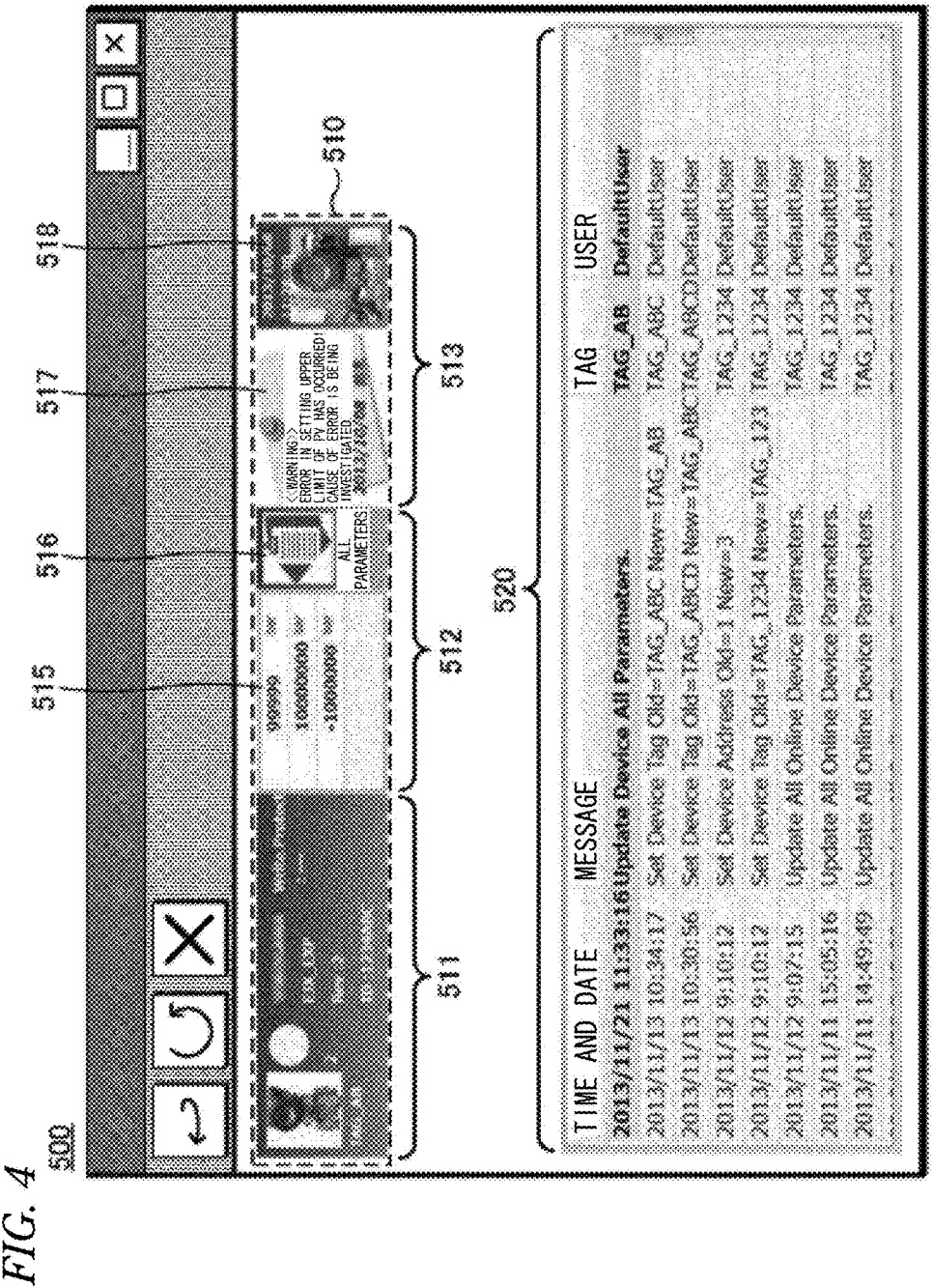
FIG. 4 is a view illustrating an example of a device information display screen displayed by the connected-device display setting module.

Then, in step S106, the device information is displayed, based on the device information stored in the device information storage module 150. FIG. 4 illustrates an example of a device information display screen 500 displayed by the connected-device display setting module 131. As illustrated in FIG. 4, the device information display screen 500 includes a device information display field 510 in which a summary of each device information can be inspected, and an operation history display field 520.

The device information display field 510 includes a fundamental information display field 511 for displaying fundamental information, a parameter display field 512 for displaying parameters, and an attached-information display field 513 for displaying attached information.

The parameter display field 512 includes a main parameter display field 515 for displaying main parameters, such as a process value (PV) and a range, and an all-parameter display panel 516 for displaying all parameters. Parameters to be displayed in the main parameter display field 515 are preliminarily determined and may optionally be set by a worker.

When an operation on the all-parameter display panel 516 is received, all parameters of the field device 200, which are stored in the device information storage module 150, are displayed by an all-parameter display screen 700 as illustrated in FIG. 5. Incidentally, all parameters can sequentially be displayed by causing a rightmost scroll bar to move up and down.

The attached-information display field 513 includes a comment display field 517 for displaying comments on the field device 200, which are input by a worker in the past, and an image display field 518 for displaying images registered corresponding to the field device 200 by a worker in the past. Notes of caution concerning the field device 200, and the like may be input as the comments. The inclusion of the comment display field 517 in the device information display field 510 enables the prevention of forgetting cautions concerning the field device 200, and occurrence of lack of informing of the cautions, and the like.

Plural comments can be input to the comment display field 517. Plural images can be registered in the image display field 518. All of the comments and the images can be browsed, edited, added, deleted, and so on. The field device management apparatus 10 and the field device 200 may be provided with a photographing function so that images obtained using the photographing function can be registered in the image display field 518.

In the operation history display field 520, a history of operations performed by a worker on the connected field device 200 is displayed in real time. This operation history display field 520 is adapted so that operations performed on the day on which the device information display screen 500 is displayed are displayed by being highlighted so as to be able to instantly recognize the operations. A display mode, such as display colors, may be varied according to the time of performing the operation. The operations performed on the field device 200 in the past can easily be checked by referring to the operation history display field 520.

Figure 6:
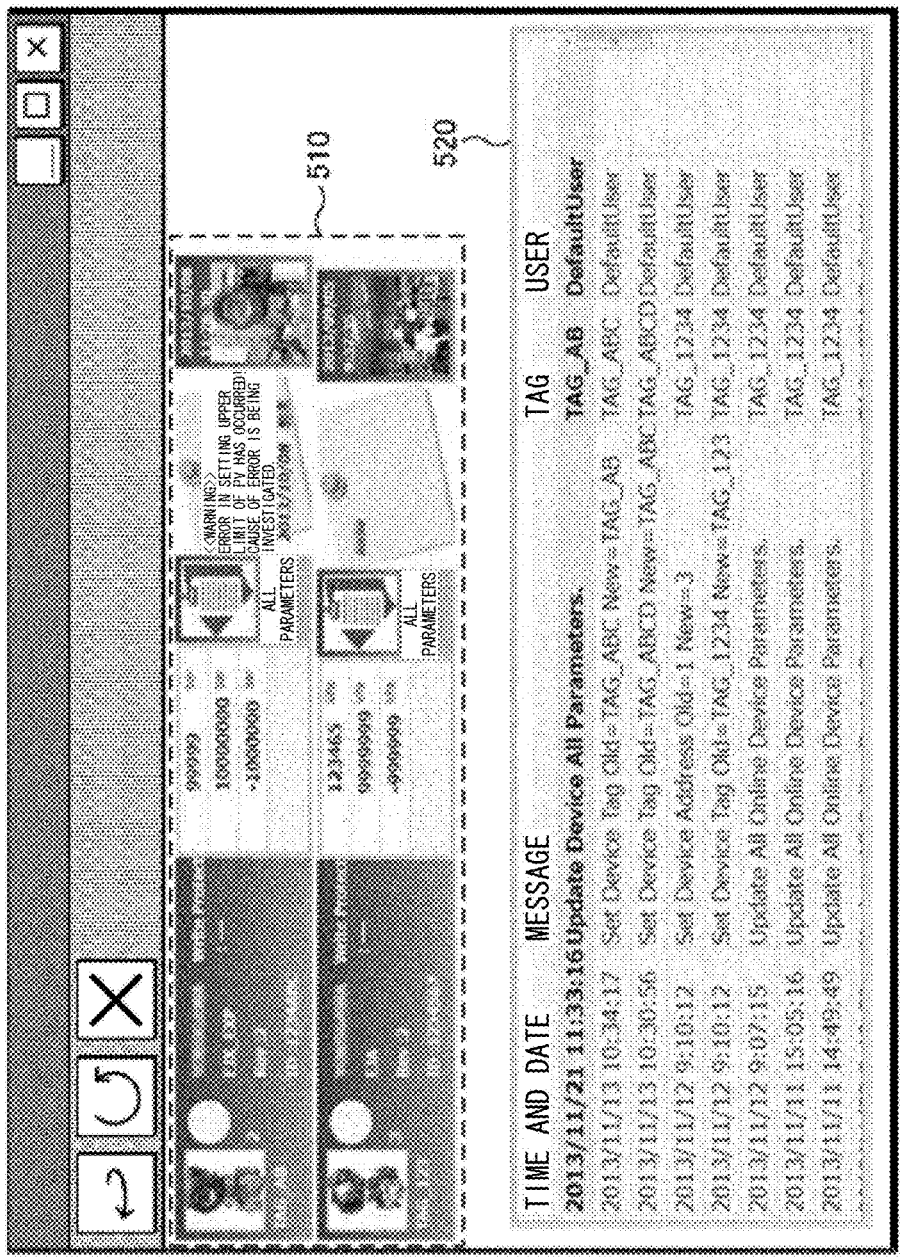
FIG. 6 is a view illustrating an example of a device information display screen when plural field devices are connected.

Incidentally, if the field device management apparatus 10 is connected to plural field devices 200, the device information is displayed in the device information display field 510 so that the device information corresponding to each field device 200 can be inspected, as illustrated in FIG. 6.

At that time, in the operation history display field 520, the histories of operations performed on each field device 200, whose device information is displayed in the device information display field 510, are collectively displayed. The apparatus may be adapted so that if a specific field device 200 is selected, the history of operations performed on the selected field device 200 is extracted and displayed in the device information display field 510.

Figure 3:
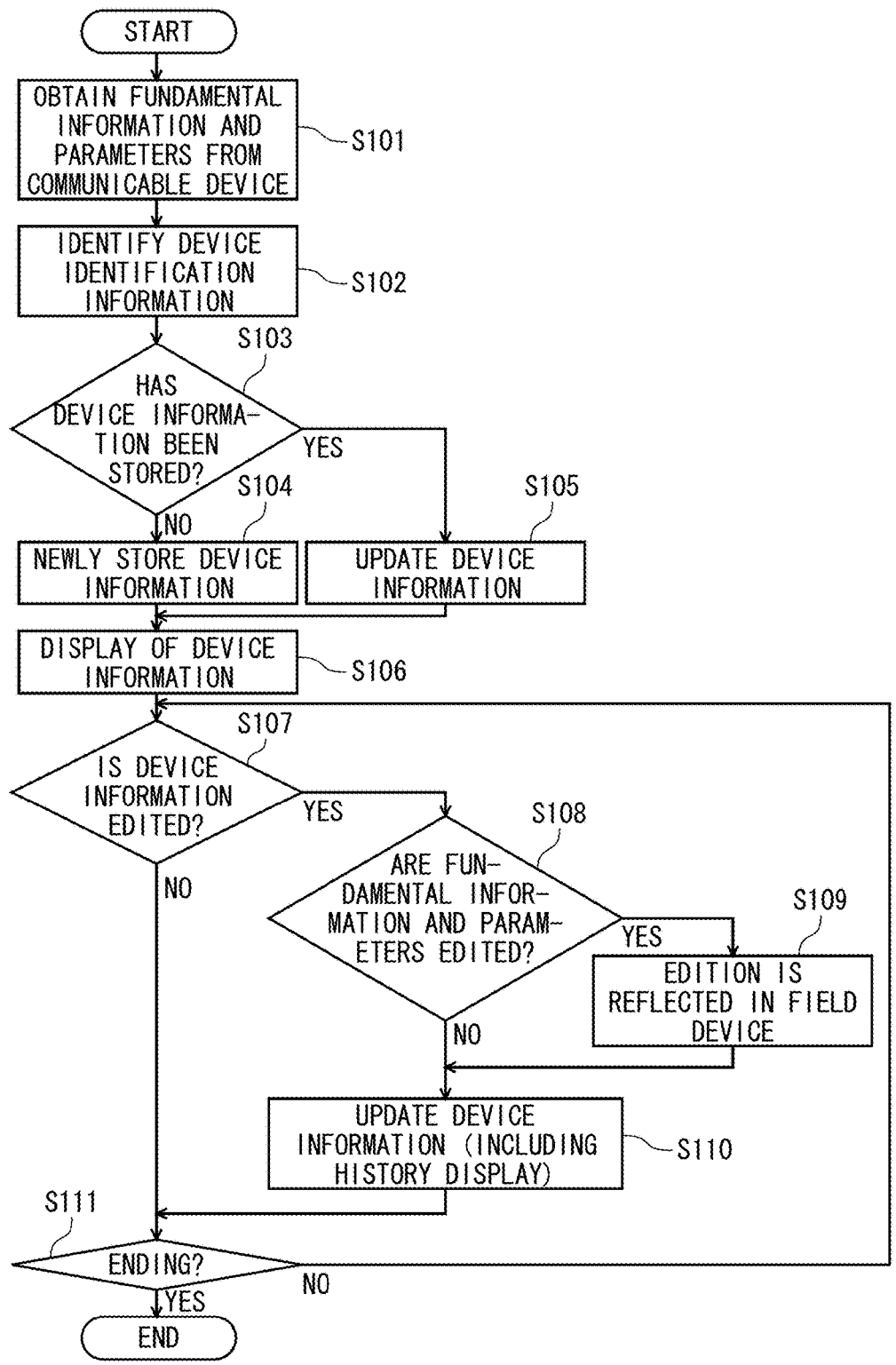
FIG. 3 is a flowchart illustrating an operation that a device information management module performs by controlling a connected-device display setting module of a user interface module.

Turning back to the description made with reference to FIG. 3, in the device information display screen 500, if the device information is edited by a worker (Yes in step S107), and an edit target is the fundamental information or the parameter (Yes in step S108), in step S109, the edit is reflected in the field device 200.

Then, in step S110, regardless of the edit target, the device information stored in the device information storage module 150 is updated with edited contents. At that time, the operation history is also updated. The updated history is reflected in the operation history display field 520 in real time.

In the related art, workers perform works on various field devices 200. Thus, work contents are stored by an explicit operation by the workers. According to this embodiment, all of the work contents and the device information are automatically recorded in the device information storage module 150. Consequently, a worker can be prevented from forgetting to store necessary information. The operation history can be utilized for evaluation of a work.

In step Sill, the device information management module 120 repeats the above process utilizing the device information display screen 500 until a worker finishes a field device maintenance work.

Figure 7:
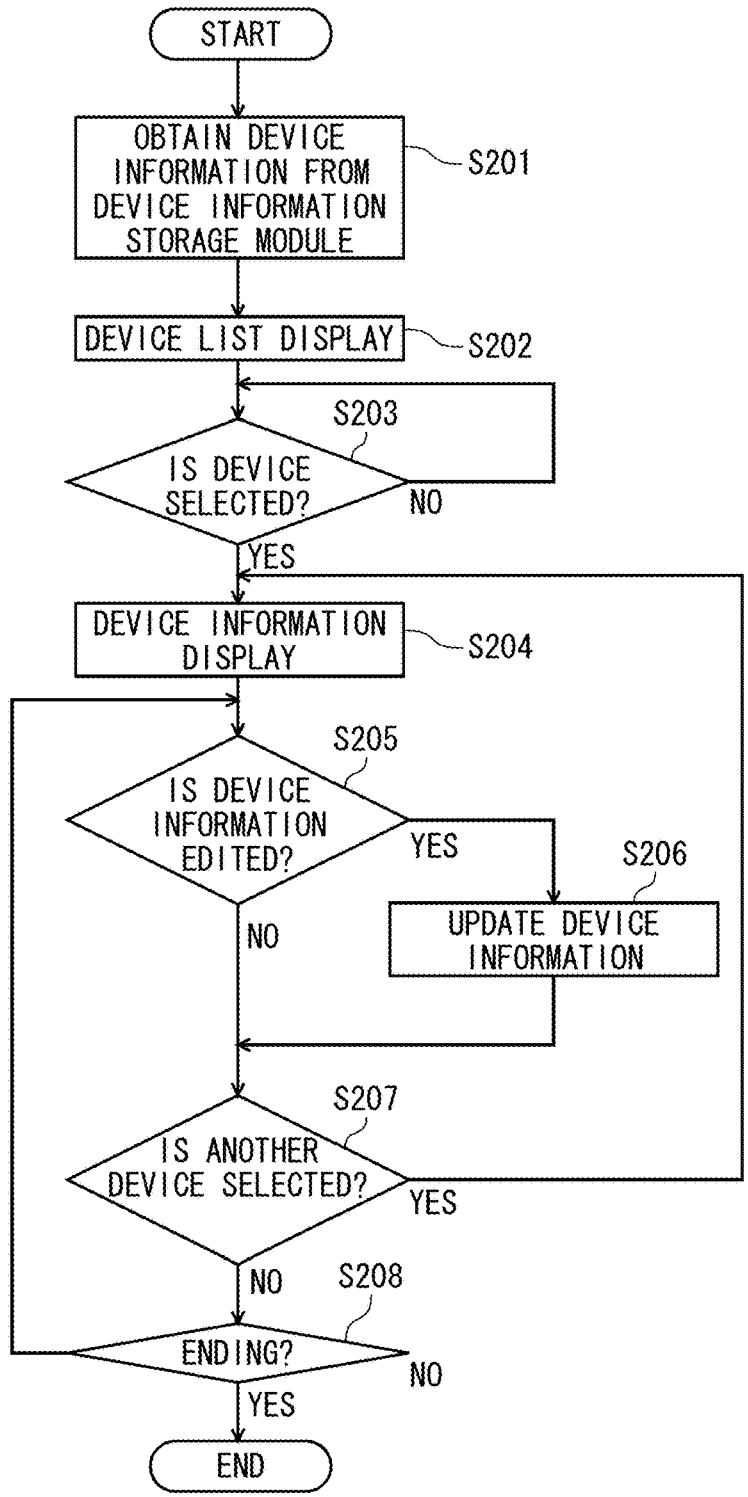
FIG. 7 is a flowchart illustrating an operation performed by the device information management module by controlling a stored-device information display setting module of a user interface module.

Next, an operation performed by the device information management module 120 by controlling the stored-device information display setting module 132 of the user interface module 130 is described with reference to a flowchart illustrated in FIG. 7.

First, in step S201, the device information management module 120 obtains device information stored in the device information storage module 150, i.e., the device information concerning the field device 200 that has been connected to the apparatus in the past.

Figure 8:
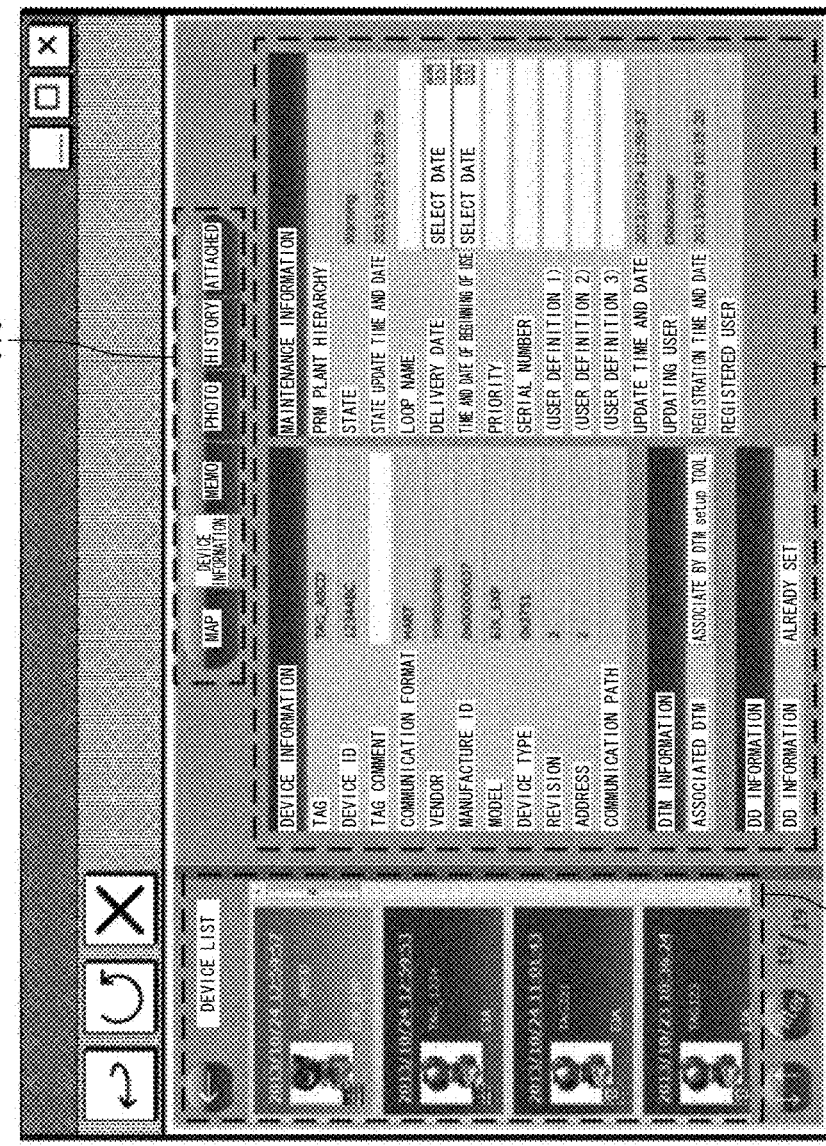
FIG. 8 is a view illustrating an example of a stored-device information display screen by the stored-device information display setting module.

Then, in step S202, the device information management module 120 displays a list of the field devices 200 corresponding to the obtained device information. The list of the field device 200 is displayed in, e.g., a device list display field 611 of a stored-device information display screen 600, which is illustrated in FIG. 8.

If a specific field device 200 is selected in the device list display field 611 (Yes in step S203), in step S204, device information of the field device 200 selected is displayed in the device information display field 612. In an example illustrated in FIG. 8, in step S204, the fundamental information of the field device 200 selected is displayed in the device information display field 612.

A display item selection menu 613 is provided in the stored-device information display screen 600. The parameters or the attached information can be displayed in the device information display field 612 by operating the display item selection menu 613. Consequently, a worker can refer to necessary device information corresponding even to the field device 200 that is not connected to the apparatus.

The device information display field 612 can receive an edit of the device information. If the device information display field 612 receives the edit of the device information from a worker (Yes in step S205), in step S206, the device information stored in the device information storage module 150 is updated with edited contents. At that time, the operation history is also updated. The updated operation history is reflected in the operation history display field 520.

If a field device 200 is not connected to the field device management apparatus 10, the fundamental information and the parameters of the field device 200 cannot immediately be changed. Thus, changed contents are recorded in the device information storage module 150. The field device management apparatus 10 may be adapted so that, for example, when the apparatus is connected to the field device 200 next time, the field device management apparatus 10 inquires of a worker whether the change is right or wrong, and that if the change is right, the field device management apparatus 10 changes the fundamental information and the parameters of the field device 200. Alternatively, the field device management apparatus 10 may be configured so that only the attached information is allowed to be edited in the device information display field 612, and that the fundamental information and the parameters are allowed to be only browsed, while editing is inhibited.

If another field device 200 is selected in the device list display field 611 (Yes in step S207), in step S204, contents displayed in the device information display field 612 are changed so as to correspond to the selected field device 200.

In step S208, the device information management module 120 repeats the above process utilizing the stored-device information display screen 600 until a worker finishes the field device maintenance work.

Figure 9:
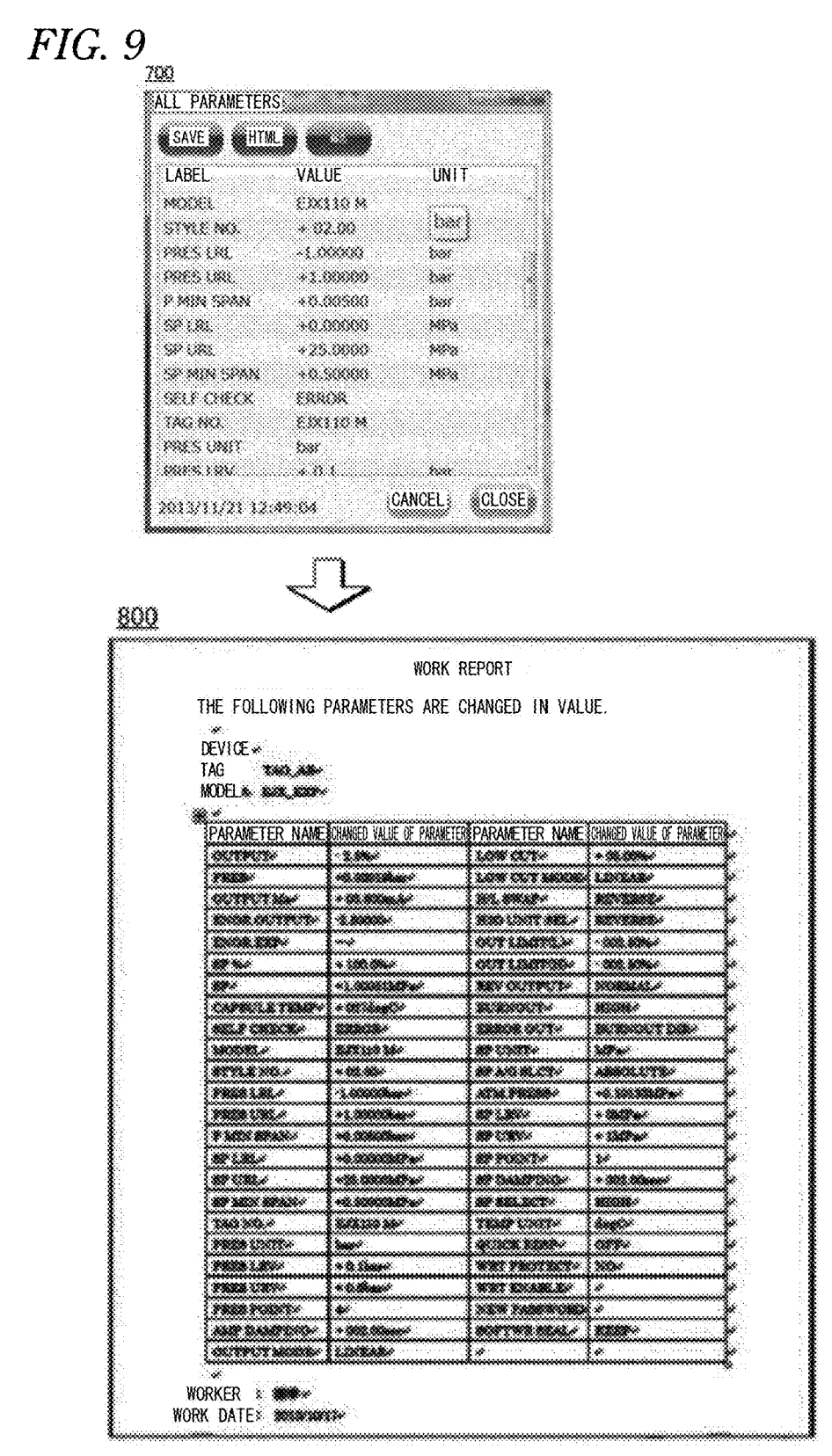
Figure 10:
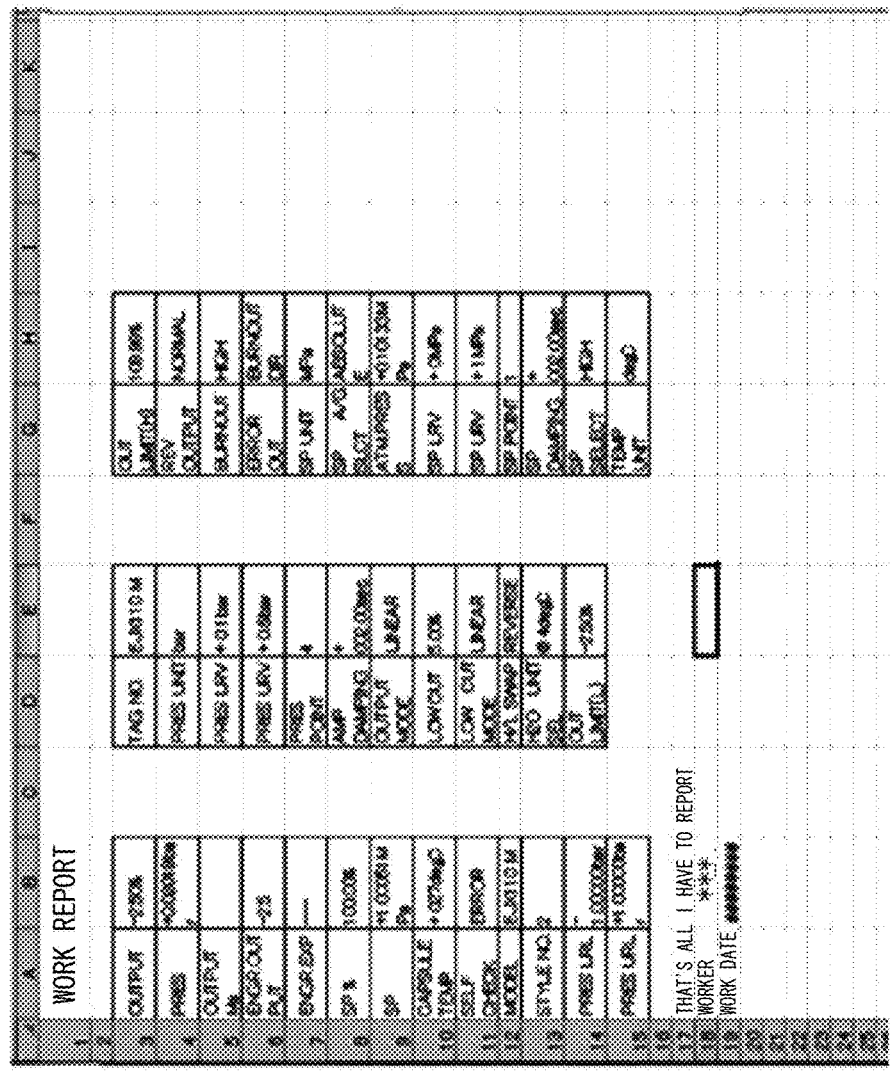
FIG. 10 is a view illustrating another example of work report.

Next, an operation of the work report making module 140 is described hereinafter. When receiving a work report making instruction in a state in which the all-parameter display screen 700 is displayed, as illustrated in FIG. 9, the work report making module 140 makes a work report 800 in a predetermined format using the parameters at that point in time. The work report making module 140 may be adapted to describe only the changed parameters in the work report 800. Alternatively, the work report making module 140 may be adapted to make a work report 820 by inputting the parameters and other information to cells used in spreadsheet software, respectively, as illustrated in FIG. 10.

The work report 800 can be made by referring to the device information storage module 150 for not only information concerning the field device 200 connected to the apparatus but information concerning the field device 200 that is not connected to the apparatus.

Hitherto, the making of a work report has owed much to manual works by workers. However, the utilization of the work report making module 140 significantly reduces time and effort for making work reports.

What is claimed is:

1. A field device management apparatus communicably connected to one or more field devices, the field device management apparatus comprising a memory and at least one microprocessor in conjunction with the memory configured to:
   obtain, from a field device of the one or more field devices that are installed in a plant and are connected to the field device management apparatus, fundamental information and one or more parameters determining operation contents;
   automatically register device information without a worker's instruction by uniquely determining device identification information based on the fundamental information and storing, in association with the determined device identification information, the device information including the fundamental information and the one or more parameters from the field device connected to the management apparatus;
   generate a device information display screen that displays a list of the device information corresponding to each of the one or more field devices that are installed in the plant and are connected to the field device management apparatus, and that receives an edit of the device information.

2. The field device management apparatus according to claim 1, wherein
   the device information further includes a history of operations performed on the field devices, and
   the at least one microprocessor is configured to display, on the device information display screen, a history of operations concerning the one or more field devices which are connected to the field device management apparatus.

3. The field device management apparatus according to claim 2, wherein the at least one microprocessor is configured to change a display mode of the history of operations according to an operation time-period.

4. The field device management apparatus according to claim 1, wherein the device information display screen displays the device information that is stored and that concerns one or more field devices which was previously connected to the field device management apparatus, but is not presently connected to the field device management apparatus.

5. The field device management apparatus according to claim 1, wherein in response to the device information being edited on the device information display screen, updating the stored device information.

6. The field device management apparatus according to claim 1, wherein the at least one microprocessor is further configured to generate a work report in a predetermined format, based on the stored one or more parameters.

7. The field device management apparatus according to claim 1, wherein determining the device identification information comprises:
   in response to the obtained fundamental information including a device identifier by which the field device is uniquely identified, the at least one microprocessor uses the device identifier included in the fundamental information as the device identification information, and
   in response to the obtained fundamental information not including the device identifier, -the at least one microprocessor uses, as the device identification information, information obtained by combining a plurality of information pieces other than the device identifier, which are included in the fundamental information.

8. The field device management apparatus according to claim 1, wherein the device information includes one or more comments concerning the field devices.

9. The field device management apparatus according to claim 1, wherein the device information includes one or more images concerning the field devices.

10. The field device management apparatus according to claim 1, wherein the at least one microprocessor is configured to display a portion of the one or more parameters on the device information display screen, and to display all the one or more parameters on a screen different from the device information display screen.

11. The field device management apparatus according to claim 1, wherein the at least one microprocessor updates, in response to the device information being edited on the device information display screen, the stored device information without the worker's instruction.

12. The field device management apparatus according to claim 1, wherein the at least one microprocessor generates a single device information display screen that displays the list of the device information that includes the fundamental information and the one or more parameters corresponding to each of the filed devices that are installed in the plant and are connected to the field device management apparatus.

13. A device information display method of a field device management apparatus communicably connected to one or more field devices, the method comprising:

obtaining, from a field device of the one or more field devices that are installed in a plant and are connected to the field device management apparatus, fundamental information and one or more parameters determining operation contents;

automatically registering device information without a worker's instruction by uniquely determining device identification information based on the fundamental information, and storing, in association with the determined device identification information, the device information including the fundamental information and the parameters; and generating a device information display screen that displays a list of the device information corresponding to each of the one or more field devices that are installed in the plant and are connected to the field device management apparatus, and that receives an edit of the device information.

14. A non-transitory computer-readable storage medium storing computer program code that, when executed, causes a processor to operate as a field device management apparatus communicably connected to one or more field devices, the computer program code comprising:

a communication code configured to cause the processor to obtain, from a field device of the one or more field devices that are installed in a plant and are connected to the field device management apparatus, fundamental information and one or more parameters determining operation contents;

a device information storage code configured to cause the processor to automatically register device information without a worker's instruction by uniquely determining device identification information based on the fundamental information, and to store, in association with the determined device identification information, the device information including the fundamental information and the parameters; and a user interface code configured to cause the processor to generate a device information display screen that displays a list of the device information corresponding to each of the one or more field devices that are installed in the plant and are connected to the field device management apparatus, and that receives an edit of the device information.

* * * * *